Figure 1:
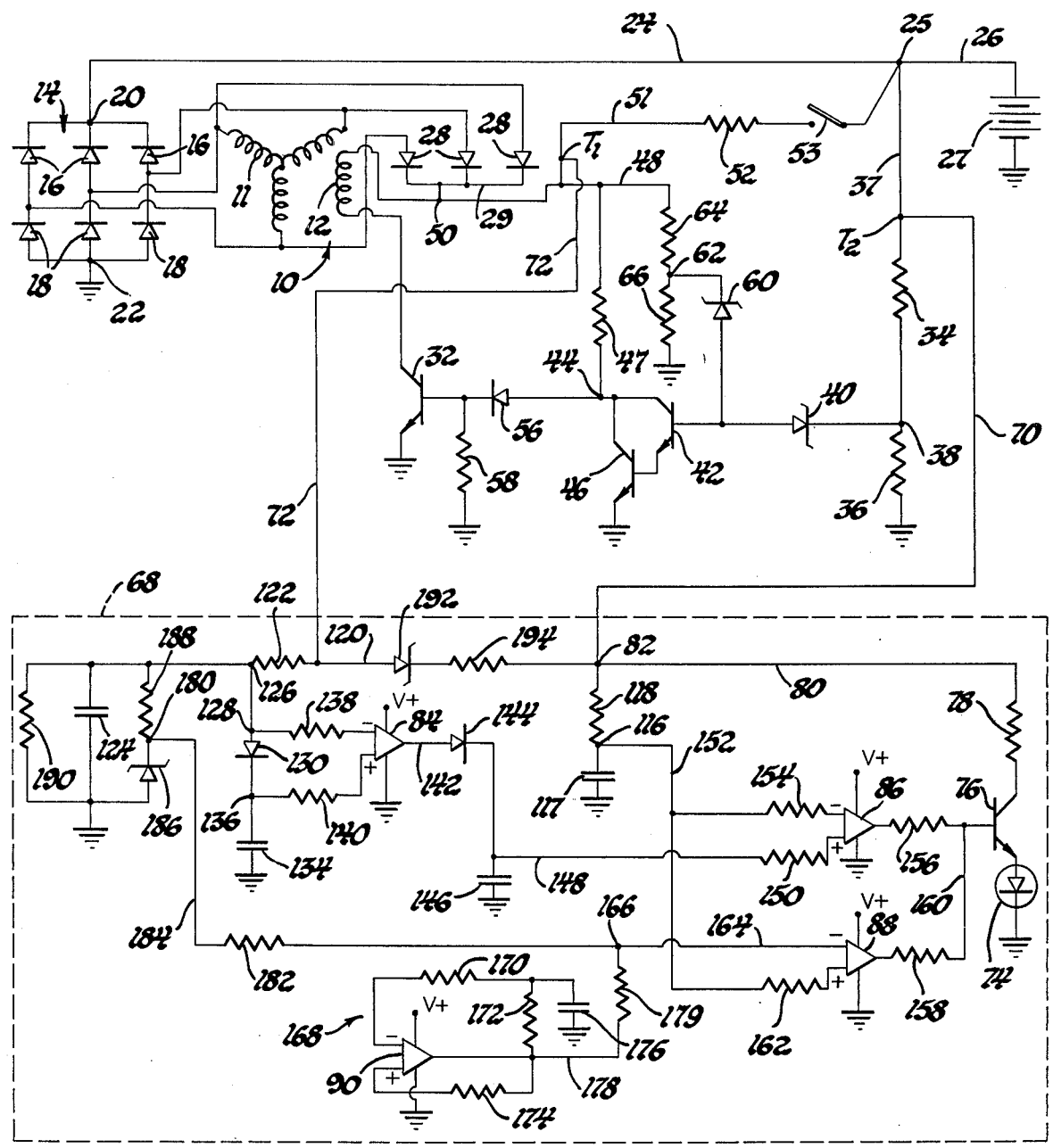

United States Patent [19]

Fattic

[11] 4,019,120
[45] Apr. 19, 1977

[54] FAULT INDICATOR FOR MOTOR VEHICLE BATTERY CHARGING SYSTEMS

[75] Inventor: Gerald T. Fattic, Anderson, Ind.

[73] Assignee: General Motors Corporation, Detroit, Mich.

[22] Filed: Apr. 2, 1976

[21] Appl. No.: 672,872

[52] U.S. Cl. .................................. 322/28; 322/99; 324/158 MG; 340/248 Y; 340/249
[51] Int. Cl.² .................... H02J 7/24; G08B 21/00; G01R 31/02
[58] Field of Search ............ 322/28, 99; 317/13 R; 324/73, 158 MG; 340/248, 248 Y, 249; 320/48, 39

[56] References Cited

UNITED STATES PATENTS

| | | | |
|---|---|---|---|
| 3,289,065 | 11/1966 | Dehmelt | 320/40 |
| 3,467,853 | 9/1969 | Harland, Jr. et al. | 322/28 |
| 3,538,362 | 11/1970 | Cheetham et al. | 310/68 |
| 3,629,704 | 12/1971 | Stevens | 324/98 |
| 3,656,135 | 4/1972 | Ruff | 340/248 |
| 3,893,029 | 7/1975 | Vensel et al. | 324/158 |
| 3,927,399 | 12/1975 | Fuzzell | 340/249 |
| 3,936,744 | 2/1976 | Perlmutter | 324/158 |

Primary Examiner—Robert J. Hickey
Attorney, Agent, or Firm—C. R. Meland

[57] ABSTRACT

A fault indicator for a motor vehicle battery charging system of the type in which a diode-rectified alternating current generator supplies charging current to the vehicle battery and supplies other loads on the vehicle. The fault indicator is capable of detecting certain faults in the diode-rectified alternator and is capable of detecting certain faults in the generator voltage regulating system. The fault indicator system utilizes current difference operational amplifiers, one of which is connected to detect sharp negative voltage transitions caused by certain faults in the system. The fault indicator also has Zener diodes connected to provide an indication of faults that cause abnormally low or high voltage outputs of the diode-rectified alternator such as an open or shorted voltage regulator. The signal indicator utilized is a light emitting diode and the fault indicator circuit is arranged so as to cause continuous illumination of the light emitting diode under certain fault conditions and a blinking of the light emitting diode during other fault conditions.

5 Claims, 2 Drawing Figures

FAULT INDICATOR FOR MOTOR VEHICLE BATTERY CHARGING SYSTEMS

This invention relates to a fault indicator system for motor vehicle battery charging systems of the type disclosed in the U.S. Pat. No. to Cheetham et al., 3,538,362. In the type of battery charging system disclosed in this patent a three-phase Y-connected output winding of alternating current generator is connected to a three-phase full-wave bridge rectifier which is utilized to charge the battery. The output voltage of the generator is controlled by a transistor voltage regulator which includes a switching transistor connected in series with the field winding of the generator. The field current supply is developed by three auxiliary diodes which together with three diodes of the main bridge rectifier form another three-phase full-wave bridge rectifier circuit for developing field current.

In the type of battery charging system that has been described certain faults in the system, for example an open stator winding, cause sharp, negative voltage transitions to occur at the output of the three auxiliary diodes that supply field current. If these negative voltage transitions are detected the faults that cause the voltage transitions can be identified. It accordingly is one of the objects of this invention to provide a fault indicator system for a motor vehicle battery charging system which is capable of detecting the negative voltage transitions that occur causes by fault conditions in the system. In carrying this object forward an operational amplifier of the type that operates on differential input currents is connected to respond to the negative voltage transitions and provides an output when a fault condition exists. The output of this operational amplifier is then utilized to cause the energization of the signalling device such as a light emitting diode.

Another object of this invention is to provide a fault indicator system which is capable of indicating the faults that cause the negative voltage transitions and which is also capable of indicating faults in the generator voltage regulator circuit of the system. In carrying this object forward a pair of Zener diodes and other circuitry is utilized which are electrically connected in the system in a manner capable of detecting either an open regulator or a shorted regulator.

When either an open regulator or a shorted regulator is detected, as opposed to faults which cause the above-mentioned negative voltage transitions, the light emitting diode is caused to blink rather than remaining continuously illuminated. This is accomplished with the fault indicator of this invention by providing an oscillator circuit connected to one input terminal of a current differencing operational amplifier. This operational amplifier is connected such that when either an open or a shorted regulator occurs a pulsating direct voltage output is developed by this operational amplifier and this voltage is utilized to cause the light emitting diode to blink on and off.

IN THE DRAWINGS

Figure 2:
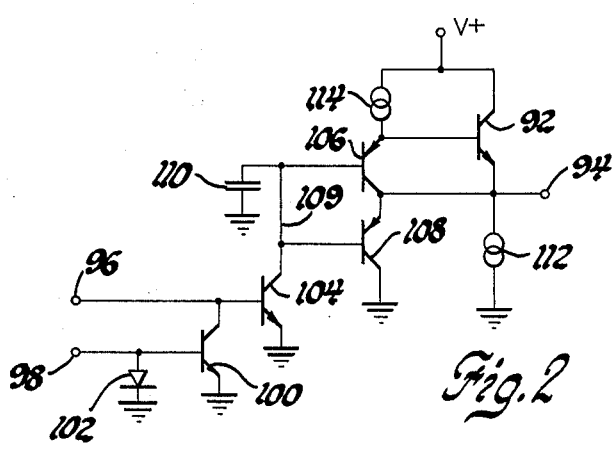

FIG. 1 is a schematic circuit diagram of a motor vehicle battery charging system having a fault detecting system of this invention connected therewith; and FIG. 2 is a schematic circuit diagram of a current difference operational amplifier utilized in the system shown in FIG. 1.

Referring now to the drawings and more particularly to FIG. 1, the reference numeral 10 designates an alternating current generator having a three-phase Y-connected stator winding 11 and a field winding 12. This generator is of the type disclosed in the U.S. Pat. No. to Cheetham et al., 3,538,362 and is driven by the engine of a motor vehicle.

The stator or output winding 11 of the alternating current generator 10 is connected to the AC input terminals of a three-phase full-wave bridge rectifier generally designated by reference numeral 14. This bridge rectifier is comprised of three position silicon diodes 16 and three negative silicon diodes 18. The bridge rectifier 14 has a positive direct current output terminal 20 and a negative direct current output terminal 22 which is grounded. The positive terminal 20 is connected to a battery charging conductor 24 which is connected to junction 25. A conductor 26 connects the junction 25 to the positive side of the vehicle battery 27.

In addition to the diodes 16 and 18 the battery charging system has three auxiliary field energizing diodes 28 which have their anodes connected respectively to the output winding 11 of the alternating current generator. The cathodes of diodes 28 are connected together by a conductor 29. The diodes 28 and the diodes 18 form a second three-phase full-wave bridge rectifier circuit which develops a direct voltage field energizing potential between conductor 29 and ground.

In order to regulate the output voltage of the generator 10 so as to maintain this voltage substantially constant the system of FIG. 1 includes a transistor voltage regulator which is of the type disclosed in the U.S. Pat. No. to Harland et al., 3,467,853. This voltage regulator comprises an NPN transistor 32 having its collector-emitter circuit connected in series with the field winding 12. The transistor 32 switches on and off in response to the voltage sensed by the regulator to control field current supplied to the field winding 12 by the bridge rectifier circuit comprised of diodes 28 and diodes 18. The transistor regulator further includes a voltage divider comprised of resistors 34 and 36 which are series connected between a terminal $T_2$ and ground. A conductor 37 connects terminal $T_2$ and junction 25 and the voltage divider therefore senses the voltage appearing between junction 25 and ground which is the battery charging voltage. Where the regulator is built into the generator, as disclosed in the above-mentioned Cheetham et al. patent, the terminal $T_2$ physically projects from the regulator and corresponds to male terminal 174 disclosed in the Cheetham et al. patent.

The junction 38 between voltage divider resistors 34 and 36 is connected to a Zener diode 40 which in turn is connected to the base of NPN transistor 42. The collector of transistor 42 is connected to a junction 44. Another NPN transistor 46 has its collector-emitter circuit connected between junction 44 and ground and has its base connected to the emitter of transistor 42. A resistor 47 is connected between junction 44 and a conductor 48. The conductor 48 is connected to a junction 50 which in turn is connected to the conductor 29.

The conductor 48 of the transistor regulator is connected to a terminal $T_1$. This terminal corresponds to the male voltage regulator terminal 172 disclosed in the above-mentioned Cheetham et al. patent.

The terminal $T_1$ is connected to a conductor 51 which is connected to a resistor 52. A manually operable switch 53 is connected between resistor 52 and junction 25. The resistor 52 may be paralleled by a generator tell-tale lamp in a manner disclosed in the above-mentioned Cheetham et al. patent.

The collector of voltage regulator transistor 46 is connected to the base of transistor 32 by a semiconductor diode 56. A resistor 58 is connected between the base of transistor 32 and ground.

The base of transistor 42 is connected to another Zener diode 60, the opposite end of this diode being connected to junction 62 located between resistors 64 and 66. The resistors 64 and 66 are series connected between conductor 48 and ground.

In the interest of simplifying the disclosure of the voltage regulator certain of the components of the regulator disclosed in the above-mentioned Harland et al. patent are not shown in FIG. 1. A brief description of the operation of the transistor regulator will now be made and reference may be had to the above-mentioned Harland et al. patent for a more complete description of operation.

The transistor voltage regulator senses the output voltage of bridge rectifier 14 by resistors 34 and 36 and causes on/off switching of transistor 32 to thereby control the current in field winding 12 to maintain a predetermined charging voltage for battery 27 and the other electrical loads on the vehicle. It will be appreciated that field current is developed by the bridge rectifier comprised of diodes 18 and 28. It therefore is seen that the path for field current will be from conductor 29 to junction 50, through field winding 12 and then through the collector-emitter circuit of transistor 32 to the negative terminal 22 of bridge rectifier 14.

The fault detector of this invention is generally designated by reference numeral 68. This fault detector has input conductors 70, 72 and various ground connections as illustrated. As is more fully explained hereinafter, the components of fault indicator 68 may be located with a suitable housing that has terminal means for connection to the battery charging system.

When it is desired to check the battery charging system the conductor 70 is connected to terminal $T_2$. Conductor 72 is connected to terminal $T_1$ and conductor 51 is disconnected from terminal $T_1$.

With conductor 70 connected to terminal $T_2$ it is at battery positive terminal voltage when the battery is not being charged and is at substantially the same potential as bridge rectifier terminal 20 when the generator is being driven by the vehicle engine and is charging the battery. Assuming a 12 volt system, the terminal $T_2$ may have a voltage of approximately 14 volts when the generator is charging the battery and the normal 12 volt battery terminal voltage when the generator is not charging the battery.

With the conductor 72 of the fault detector connected to terminal $T_1$ it will have the same potential as conductor 29. This means that the conductor 72 experiences the field energizing potential developed by diodes 18 and 28. The ground connection for the fault detector is made to the vehicle electrical system ground.

The fault detector and indicator 68 has a signal light indicator which takes the form of a light emitting diode 74. This light emitting diode is connected in series with the collector-emitter circuit of an NPN transistor 76. The collector of this transistor is connected to resistor 78 and the opposite end of this resistor is connected to a conductor 80. It can be seen that conductor 80 is at the same potential as conductor 70 due to the connection of conductor 70 to junction 82. As will be more fully explained hereinafter the base voltage of transistor 76 is controlled in response to certain faults in the battery charging system to cause the transistor 76 to conduct and therefore supply illuminating current to the light emitting diode 74. As also further explained the transistor 76, at times, is switched on and off to cause the light emitting diode 74 to blink on and off indicating certain other faults in the system.

The fault detector 68 utilizes four identical current difference operational amplifiers designated respectively by reference numerals 84, 86, 88 and 90. These four amplifiers are of the known National Semiconductor Corp. (Santa Clara, Calif.) LM3900 type and the four amplifiers are available in a single package in which all of the amplifiers are biased by known common input circuitry available in the package. These current different amplifiers perform various functions in the fault detector as is more fully described hereinafter. A simplified schematic of one of the four amplifiers of the LM3900 type is disclosed in FIG. 2. As seen in FIG. 2, the positive voltage terminal V+ is connected with a collector of an NPN transistor 92. The emitter of transistor 92 is connected with an output terminal 94 and the output is taken between this terminal and ground. The input terminals are designated by reference numerals 96 and 98. Input terminals 98 is connected to the base of NPN transistor 100. A semiconductor diode 102 connects the base of transistor 100 to ground. The other input terminal 96 is connected to the base of another NPN transistor 104. The collector of transistor 104 is connected with the base electrodes of PNP transistors 106 and 108. A capacitor 110 is connected between conductor 109 and ground. The collector of PNP transistor 106 is connected to the emitter of PNP transistor 108 and these two electrodes are connected to output terminal 94.

As mentioned above, FIG. 2 is a simplified schematic of one of four current difference amplifiers which are powered by a voltage supply connected between V+ and ground. The four amplifiers of the LM3900 package are biased by known transistor bias circuitry which is not illustrated in detail and which, for simplification purposes, is disclosed as current sources designated by reference numerals 112 and 114.

The LM3900 package containing the four amplifiers has a positive power supply terminal which, for convenience of illustration, is designated as V+ for each of the four amplifiers illustrated in FIG. 1. The V+ terminal of the amplifier package is electrically connected to junction 116 by conductor means which has not been illustrated. The junction 116 is connected to the positive side of battery 26 by means of a resistor 118 having resistance value of approximately 10 ohms. A filter capacitor 117 is connected between junction 116 and ground. It is to be understood that the ground terminals for operational amplifiers 84–90 are suitably connected to a common ground connection. With this arrangement the four operational amplifiers will be supplied with a bias voltage dependent upon the direct voltage existing between junction 116 and ground and applied to the amplifiers between V+ and ground.

It has been discovered that a number of faults that occur in the battery charging system cause sharp, negative voltage transitions at the conductor 29 of the system and at terminal $T_1$ which is connected to conductor 29. Thus, an open phase in stator winding 10, a shorted negative diode 18 of bridge rectifier 20, an opening of one of the auxiliary diodes 28 or a grounded stator neutral will cause sharp negative voltage transitions at conductor terminal $T_1$. In order to detect these faults the voltage at terminal $T_1$ is applied to the input terminals of current difference amplifier 84. To this end the conductor 72, which is connected to terminal $T_1$, is connected with a conductor 120 which in turn is connected to resistor 122 having a resistance of approximately 100 ohms. The resistor 122 and capacitor 124 are connected in series between conductor 120 and ground. These two components operate as a filter for filtering the voltage applied between junction 126 and ground.

It is seen that the junction 126 is connected to a junction 128. A series connected diode 130 and capacitor 134 are connected between junction 128 and ground with the capacitor and diode having a common junction 136. The negative input terminal of current difference amplifier 84 is connected to junction 128 through a resistor 138. The other input terminal of amplifier 84 is connected to junction 136 through a resistor 140. The resistors 138 and 140 may have resistance values, for example of 390k ohms and 510k ohms respectively. The capacitor 134 may have a value of 0.22 microfarads.

During normal operation of the system, that is when no sharp negative voltage transitions occur on conductor 72, the capacitor 134 will be charged to some voltage dependent upon the voltage appearing on conductor 72. During this mode of operation the junctions 128 and 136 are at substantially the same voltage, the only difference in potential being a small voltage drop across the semiconductor diode 130.

In the event of a sharp negative voltage transition on conductor 72 indicative of a fault in the battery charging system of the type described above, the potential of junction 128 will drop whereas the potential of junction 136 will remain at some value determined by the charge on capacitor 134. When this happens a differential input current is supplied to the current difference amplifier 84 with more current being supplied to the terminal connected to resistor 140 than to the terminal connected to resistor 138. This causes the amplifier 84 to switch from a low to a high output voltage and this output voltage is applied to conductor 142. This voltage will be pulsating direct voltage which is filtered by diode 144 and capacitor 146. This filtered direct voltage is applied to the input terminal of another current difference amplifier 86 through conductor 148 and resistor 150. The other input terminal of amplifier 86 is connected to a conductor 152 by a resistor 154. The relative values of resistors 154 (10 megohms) and 150 (1 megohm) are such that when a direct voltage of predetermined magnitude is applied to conductor 148 due to a fault condition the amplifier 86 develops an output voltage that is applied to the base of transistor 76 through a 10k ohm resistor 156. This voltage is of sufficient magnitude to bias the transistor 76 conductive with the result that the light emitting diode 74 becomes illuminated to indicate a fault condition. This fault condition that is now indicated is caused by the assumed initial sharp negative voltage transitions on conductor 72.

As previously mentioned there are certain fault conditions which will cause the light emitting diode 74 to blink rather than to be maintained continuously illuminated. To this end, the base of transistor 76 is connected with the output of amplifier 88 by a 10k ohm resistor 158 and conductor 160. One of the input terminals of amplifier 88 is connected to conductor 152 through a 210k ohm resistor 162. The other input terminal of amplifier 88 is connected to conductor 164.

Conductor 164 is connected with junction 166. This junction is supplied with square wave voltage pulses by a square wave oscillator generally designated by reference numeral 168. Although this square wave oscillator can take various configurations it utilizes one of the four current difference operational amplifiers, namely amplifier 90, connected in an oscillator configuration. This is accomplished by connecting amplifier 90 to resistors 170, 172 and 174. The oscillator circuit further includes a capacitor 176. The oscillator output is applied to junction 166 and conductor 164 by a conductor 178 and a resistor 179 having a reference of 180k ohms. The connection of the amplifier 90 as an oscillator is well known to those skilled in the art.

The junction 166 is connected to a junction 180 through a 100k ohm resistor 182 and conductor 184. The junction 180 is connected between a Zener diode 186 and a resistor 188 having a resistance of approximately 1000 ohms. A resistor 190 (1000 ohms) is connected across resistor 188 and Zener diode 186. In the assumed 12 volt system the break down voltage rating of Zener diode 186 is approximately 8 volts.

The fault detector further includes a second Zener diode 192 connected in series with a small current limiting resistor 194 which may be approximately 6 ohms. The resistor 194 and Zener diode 192 are connected in series between junction 82 and conductor 120. Again assuming a 12 volt system the break down voltage of Zener diode 192 will be in a range of 7 to 8 volts.

During normal operation of the charging system, and assuming that the voltage regulator is properly controlling the excitation of field winding 12, the voltage of conductors 24 and 29 will be substantially equal at, for example 14 volts in a 12 volt system. This means that under this condition of operation conductors 70 and 72 will be at substantially the same potential. In addition, conductor 120 will be at approximately 14 volts relative to ground with the result that 8 volt Zener diode 186 will break down causing a voltage of 8 volts to be applied to conductor 184. This voltage provides current through resistor 182 to the negative terminal of current difference amplifier 88. The positive terminal of this amplifier is connected to conductor 70, which is at approximately 14 volts, through resistors 118 and 162. Under the assumed normal condition of operation of the voltage regulator the two current inputs to amplifier 88 are of such values that the output of amplifier 88 is low with the result that light emitting diode 74 is not energized.

If the battery charging system develops a type of fault which cuts off field current, for example an open transistor 32 or an open field winding 12, the output voltage of the generator drops because of loss of field excitation with a resultant drop in voltage on conductors 24 and 29 and on conductor 72. Even though generator voltage drops, the voltage of battery 27 is applied to conductor 120 through junction $T_2$, conductor 70, junction 82, resistor 194 and Zener diode 192. The opposite side of Zener diode 192 is connected to ground through resistor 122 (100 ohms) and resistor 190 (1000 ohms). Since the Zener diode 192 has a break down voltage of approximately 7 volts and since battery voltage is 12 volts the voltage appearing at junction 180 will be approximately 5 volts and therefore not sufficient to break down the 8 volt Zener diode 186. The voltage at junction 180, which is now less than 8 volts, is applied to the negative terminal of current difference amplifier 88 through resistor 182. Conductor 70 is now at the positive battery voltage of 12 volts and this voltage is applied to the positive terminal of amplifier 88 through the small resistor 118 and resistor 162. The input currents to current difference amplifier 88 are now such as to cause the output of amplifier 88 to go high as modified by the pulsating current into amplifier 88 from oscillator 168. The net result is that amplifier 88 has a pulsating output at the frequency of the oscillator which biases transistor 76 on and off continuously causing the light emitting diode 74 to blink on and off.

In the event of a fault condition which causes a high output voltage of the generator, for example a shorted transistor 32 which causes continuous full field current, the fault detector 68 will again cause a blinking operation of light emitting diode 74. Assuming this high voltage condition the voltage on lines 70 and 72 may for example exceed 16 volts in a 12 volt system. When this happens this voltage is applied to the 8 volt Zener diode 186 through resistors 122 and 128 with a result that this diode breaks down with the further result that a constant voltage of approximately 8 volts appears at junction 180 and is applied to negative terminal of current difference amplifier 88 through resistor 182. The voltage conductor 70 is at the high value, in excess of 16 volts, and is applied to the positive terminal of amplifier 88 through resistors 118 and 162. The resistance values of resistors 162 and 182 are such that the 8 volts applied to the negative terminal of amplifier 88 and the higher voltage on conductor 70 applied to the positive terminal of amplifier 88 a current differential of such magnitude exists as to cause the amplifier 88 to develop a pulsating output voltage in conjunction with oscillator 168. This pulsating direct voltage is applied to the base of transistor 76 causing transistor 76 to switch on and off with a resultant blinking of light emitting diode 74.

In regard to the detection of faults that cut off field current it is pointed out that any voltage generated by generator 10 with no field current will depend in magnitude on the magnetic retentivity of the magnetic parts of the generator. In any event, the drop in output voltage of the generator, due to loss of field current, is such as to cause battery voltage to break down Zener diode 192 with a consequent fault indication as previously explained.

The fault indicator 68 may be suitably packaged in a housing and leads 70 and 72 and a ground lead be provided for connection to the battery charging system in a manner disclosed in FIG. 1. Where the generator and regulator are combined in one unit, as disclosed in the above-mentioned Cheetham et al. patent, the conductors 70 and 72 may take the form of wires connected between a pair of connectors having female terminals. The female terminals of the connectors are then respectively connected to a pair of male terminals provided on indicator 68 that are connected respectively to junction 82 and conductor 120 and male terminals like those identified by reference numerals 172 and 174 disclosed in the above-referenced Cheetham et al. patent. In such an arrangement the ground connection can be made by a lead wire extending from indicator 68 having an alligator chip for connection to a vehicle ground. The indicator 68 can be provided with a third male terminal carried by the indicator 68 and electrically connected internally of the indicator to the male terminal connected to junction 82. The conductor 37 has a female connector that mates with this male terminal.

In using the fault indicator of this invention, connections from indicator 68 to the battery charging system are made in the manner disclosed in FIG. 1 and the vehicle engine is than started which drives the generator 10. The engine is run at fast idle and the generator can be loaded by energizing various accessories on the vehicle. The indicator lamp 74 is observed during operation of the charging system to determine if any faults exist. It will be appreciated that the vehicle battery charging system is tested while in actual operation and without removing any components from the vehicle.

Although the current difference amplifiers 84, 86, 88 and 90 have been designated as the LM3900 type it will be appreciated by those skilled in the art that other equivalent amplifiers can be utilized. Moreover, the specific configuration of the transistor voltage regulator disclosed herein could be varied.

What is claimed is:

1. A malfunction indicator for a motor vehicle battery charging system comprising, an alternating current generator having a polyphase output winding and a field winding, a first fullwave bridge rectifier connected to said output winding, a battery connected across the direct current output terminals of said first bridge rectifier to be charged thereby, second rectifier means connected with said output winding, said second rectifier means and certain of the rectifiers of said bridge rectifier providing a field energizing rectifier circuit having direct current field energizing terminals, voltage regulating means including a field current control means, means connecting said field winding and said field current control means across said field energizing terminals of said field energizing rectifier circuit to provide regulated field excitation for said generator, an amplifier having first and second inputs operative to provide an output signal when the input currents to said amplifier inputs differ by a predetermined amount, means connecting the inputs of said amplifier to said field energizing terminals including a diode connected across said amplifier input terminals and a capacitor connected between one amplifier input terminal and one field energizing terminal, said diode and capacitor operative to cause a differential input current to be supplied to said amplifier inputs of sufficient magnitude as to cause said amplifier to develop a first output fault signal in response to the occurrence of sudden voltage transitions across said field energizing terminals indicative of certain faults in said system, means connected to said battery and to one of said field energizing terminals for providing a second fault signal when a predetermined voltage difference exists therebetween indicative of faulty field excitation, and fault signal indicating means operative to respond to said first and second fault signals.

2. A malfunction indicator for a motor vehicle battery charging system comprising, an alternating current generator having an output winding and a field winding, a full-wave bridge rectifier connected to said output winding having direct voltage output terminals, a battery, first and second conductor means respectively connecting said direct voltage output terminals of said bridge rectifier to said battery, field energizing rectifier means connected to said output winding having direct voltage output terminals, a field excitation circuit connected across said direct voltage output terminals of said field energizing rectifier means comprising said field winding and the field current control means of a voltage regulating means, a first junction connected to one of said first and second conductor means, said first junction having a voltage of a regulated value determined by said voltage regulating means which is in excess of battery voltage during normal operation of said field excitation circuit, the voltage of said first junction being substantially equal to battery terminal voltage during an open condition of said field excitation circuit and higher than said regulated value during a shorted condition of said field excitation circuit, a second junction, said second junction located in a circuit connected across the direct voltage output terminals of said field energizing rectifier means, said last-named circuit including a first Zener diode connected between said second junction and one of the direct voltage output terminals of said field energizing rectifier means, the voltage of said second junction substantially equalling the break down voltage of said first Zener diode when the output voltage of said field energizing rectifier means is substantially equal to or in excess of said regulated value, a second Zener diode connected between said first and second junctions, the break down voltage of said second Zener diode being of such a value that the voltage of said second junction is less than the break down voltage of said first Zener diode when the output voltage of said generator drops to some value indicative of an open condition in said field excitation circuit, and means connected to said first and second junctions for developing a fault signal when the voltage of said first junction exceeds the voltage of said second junction by a predetermined amount.

3. A malfunction indicator for a motor vehicle battery charging system of a type that has an alternating current generator connected to first rectifier means for supplying charging current to the battery and having second rectifier means connected to the generator to provide generator field excitation comprising, an input circuit adapted to be connected across the output terminals of said second rectifier means, said input circuit having positive and negative terminal ends adapted to be connected with like polarity terminals of said second rectifier means, said input circuit comprising in a series connection a diode and a capacitor having a common junction, said diode having its anode connected to said positive end of said input circuit and its cathode connected to said common junction, said capacitor connected between said common junction and said negative end of said input circuit, a first current difference amplifier having first and second input terminals, said current difference amplifier developing an output when the current supplied to its first input terminal exceeds the current supplied to its second input terminal, means connecting said input terminals of said first amplifier respectively to opposite sides of said diodes with said first amplifier input terminal connected to said common junction, the voltage attained by said capacitor operative to cause a differential input current to be supplied to said first amplifier of sufficient magnitude as to cause said first amplifier to develop an output when a negative voltage transition indicative of a fault in said battery charging system is applied to said input circuit, a filter circuit connected to the output of said first amplifier for filtering the pulsating output of said first amplifier, a second current difference amplifier having an input connected to receive the filtered output of said first amplifier, and fault signal indicating means responsive to the output voltage of said second amplifier for indicating the occurrence of a fault condition.

4. A malfunction indicator for a motor vehicle battery charging system comprising, an alternating current generator having a polyphase output winding and a field winding, a first bridge rectifier connected to said output winding having positive and negative direct voltage output terminals, a battery, conductor means connecting said direct voltage output terminals of said bridge rectifier to said battery, second field energizing rectifier means connected with said output winding having direct voltage output terminals, voltage regulating means including a field current control means, means connecting said field winding and said field current control means across said output terminals of said second rectifier means, a fault detecting circuit connected across the output terminals of said second rectifier means, said fault detecting circuit including means for developing a fault signal in response to the occurrence of sharp negative voltage transitions developed across said output terminals of said second rectifier means as a result of the occurrence of certain faults in said system, a first junction, means connecting said first junction to the conductor means connecting the positive direct voltage output terminal of said bridge rectifier to the positive terminal of said battery, the voltage of said first junction substantially equalling the voltage of the positive direct voltage output terminal of said bridge rectifier when the output voltage of said bridge rectifier exceeds battery voltage and substantially equalling the voltage of the positive terminal of said battery when the output voltage of said bridge rectifier is less than battery voltage, a second junction located on said fault detecting circuit, means coupled to said first and second junctions for developing a differential voltage of predetermined magnitude when the output voltage of said generator is abnormally higher or lower than a desired regulated value to be maintained by said voltage regulating means, means responsive to said differential voltage for developing a second fault signal, a signal light, means responsive to the occurrence of one of said fault signals for causing said signal light to be continuously energized, and means responsive to the other of said fault signals for causing said signal light to blink on and off.

5. A malfunction indicator for a motor vehicle battery charging system comprising, an alternating current generator having an output winding and a field winding, power bridge rectifier means having direct voltage output terminals connected to said output winding, a battery, power supply conductor means respectively connecting the direct voltage output terminal of said bridge rectifier to said battery for supplying charging current thereto, second rectifier means connected to said output winding having direct voltage output terminals, voltage regulating means including a field current control means, means connecting said field winding and said field current control means across the direct voltage output terminals of said second rectifier means, the output voltage developed across said second rectifier means exhibiting sharp negative voltage transitions during a fault condition of said system, fault detecting means connected across the output terminals of said second rectifier means, said fault detecting means including a first current difference amplifier operative to develop an output when a sharp negative voltage transition indicative of a fault condition occurs, a first junction, means connecting said first junction to one of the power conductors connecting the bridge rectifier to one terminal of said battery, the voltage of said first junction having a potential which is a function of the output voltage of said bridge rectifier when the output voltage of said bridge rectifier is in excess of battery voltage and having a voltage substantially equal to battery voltage when the output voltage of said bridge rectifier is less than battery voltage, a second junction connected to said fault detecting means whereby it has a voltage related to the output voltage of said second rectifier means, means including a second current difference amplifier connected to said first and second junctions and operative to cause said second amplifier to have an output when the output voltage of said generator is above or below a desired regulated value, an oscillator connected to said second amplifier, a light emitting diode, control means connected with said light emitting diode for controlling the energization thereof, and means respectively connecting the outputs of said first and second current difference amplifiers to said control means whereby said light emitting diode is continuously energized when said first amplifier develops an output and is caused to blink on and off at the output frequency of said oscillator when said second amplifier has an output.

* * * * *